United States Patent [19]
Neumann

[11] Patent Number: 4,523,093
[45] Date of Patent: Jun. 11, 1985

[54] SCANNING BEAM REFERENCE AND READ SYSTEM

[75] Inventor: Don B. Neumann, Laguna Beach, Calif.

[73] Assignee: Excellon Industries, Torrance, Calif.

[21] Appl. No.: 409,906

[22] Filed: Aug. 20, 1982

Related U.S. Application Data

[63] Continuation-in-part of Ser. No. 298,907, Sep. 3, 1981, Pat. No. 4,447,723.

[51] Int. Cl.³ .............................................. H01J 3/14
[52] U.S. Cl. .................................. 250/234; 250/216; 358/293
[58] Field of Search ............... 358/206, 214, 290, 292, 358/293, 294; 350/102, 103, 106, 107; 356/443, 444; 250/237 G, 234, 235, 236, 216, 237 R, 566, 571, 572; 353/20; 355/8, 11

[56] References Cited

U.S. PATENT DOCUMENTS

| | | | |
|---|---|---|---|
| 3,331,688 | 7/1967 | Altman | 350/102 |
| 3,443,072 | 5/1969 | Mori | 350/102 |
| 3,594,087 | 7/1971 | Miranda | 356/444 |
| 3,806,222 | 4/1974 | Knappe | 358/206 |

*Primary Examiner*—David C. Nelms
*Attorney, Agent, or Firm*—Gausewitz, Carr, Rothenberg & Edwards

[57] ABSTRACT

The laser beam of a flying spot scanner is turned on and off to write data under control of a reference clock that generates clock signals determined by the position of the writing beam. To detect position of the writing beam a reference beam is scanned in synchronism with the writing beam along and through a coding mask to a strip of retroreflective material fixed adjacent the mask. The reference beam is retroreflected through the mask back through the scanning optics to a fixed detector that produces an output determined by the scanning coded reference beam. Unwanted reflections from the mask surface are separated by tilting the mask. Reading of a document having a pattern of opaque and transparent areas is accomplished by retroreflecting a scanning laser reading beam from a body of retroreflective material adjacent to but spaced from one surface of the document. The scanning beam passes through transparent areas of the document and is retroreflected back through the document and through the scanning optics for collection by a fixed detector.

20 Claims, 12 Drawing Figures

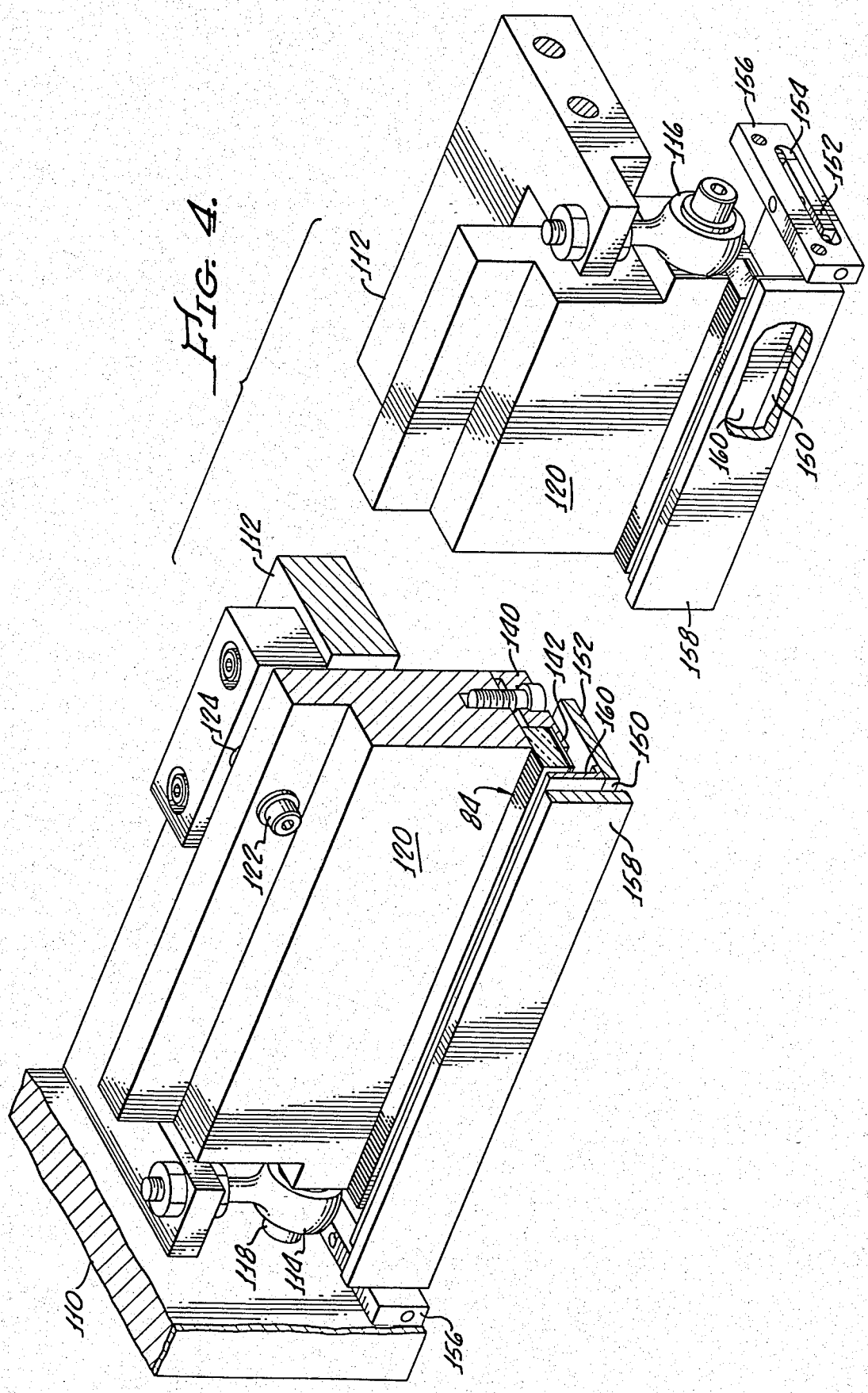

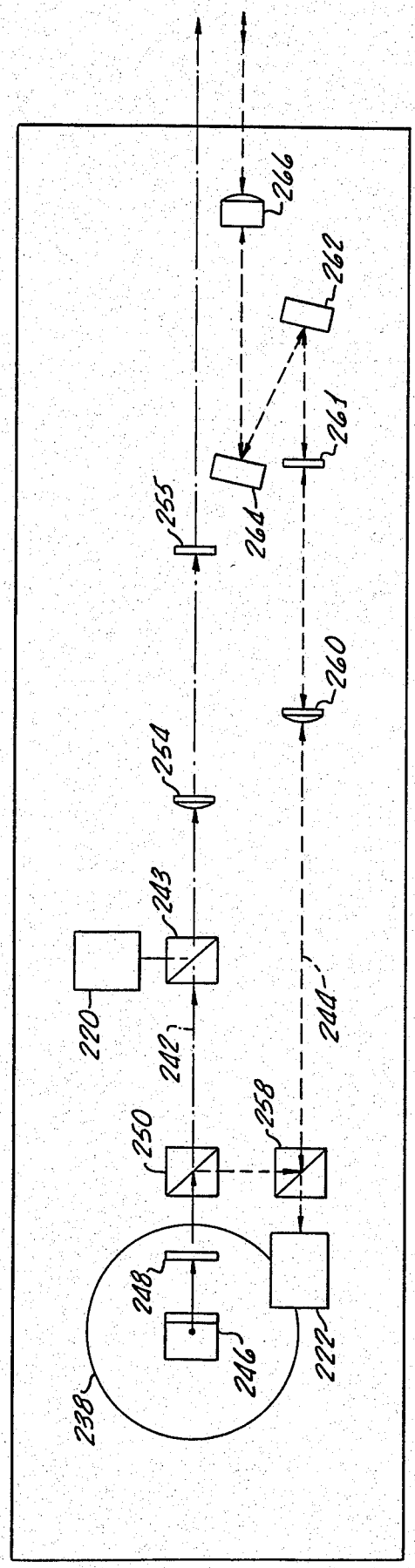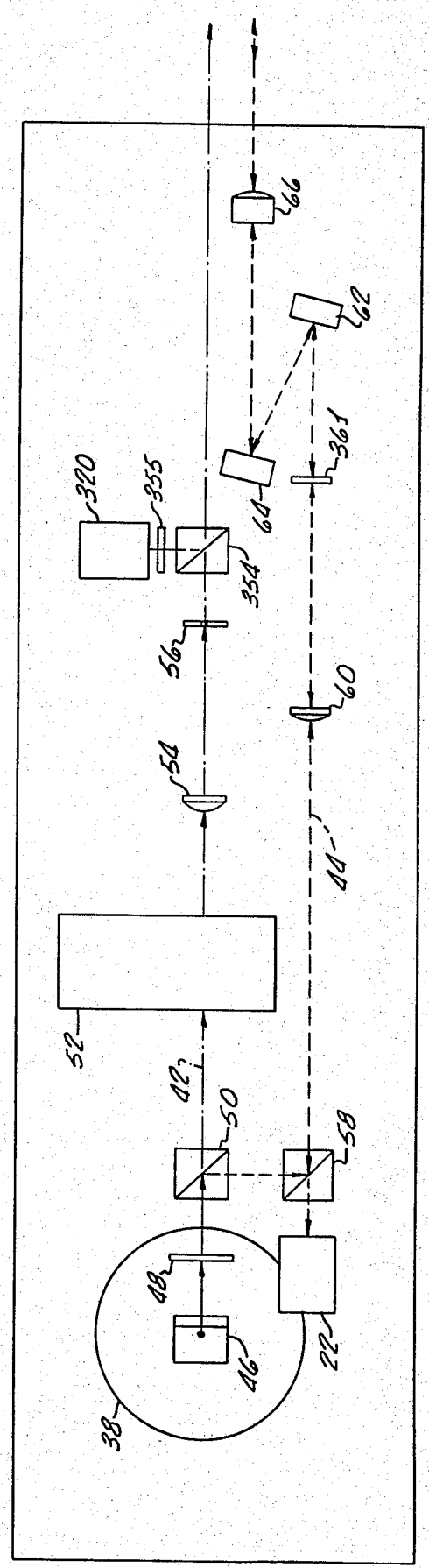

SCANNING BEAM REFERENCE AND READ SYSTEM

This application is a continuation-in-part of U.S. patent application Ser. No. 298,907, filed Sept. 3, 1981, now U.S. Pat. No. 4,447,723 for Scanning Beam Reference.

BACKGROUND OF THE INVENTION

The present invention relates to scanning beam writing and reading systems and more particularly concerns improved methods and apparatus for collection of reflected light for document reading or for producing a coded reference beam to define position of the write or read beam in the course of its scan.

In the writing of data by means of a flying spot scanner, an energy beam such as a laser beam, is reflected from a scanning mirror to scan a write medium along a linear scan path that is caused to move transversely relative to the scan path. The energy beam is modulated, generally being turned on or off in accordance with data to be written and, thus, writes a desired data pattern by means of a succession of spots or dots. In order to know when to turn the energy beam on and off in the course of each line scan it is necessary to know the location of the beam. This can be done by sensing initiation of each scan line if scan velocity is linear. However, many types of scanning devices and their optical systems exhibit a nonlinear scan velocity. Thus, in many systems, the speed with which the writing spot traverses the write medium varies in the course of a single scan line. Therefore, the location of the beam on the write medium is not a fixed nor readily compensible function of time. Also, in some scanning systems nonlinearities may be so great as to introduce unacceptable intensity variations in the course of the scan.

To account for such nonlinearities, systems have been devised to sense the actual location of the write beam. This is frequently accomplished by causing a reference beam to scan a periodic mask in synchronism with the scan of the write beam across the write medium. Beam energy transmitted by the periodic mask is then detected and employed to develop a clock signal used to control modulation of the write beam.

In such reference beam systems problems are encountered in the collection of energy transmitted from the periodic mask. A scan line may be 18 inches in length, in some systems, and thus, a mask of similar dimensions is employed. Collection of light over such a distance has required the use of fiber optics or a Fresnel lens. Other arrangements have employed elliptical reflectors for reflecting energy from the mask to a detector at one focal point of the ellipse, the scanner being positioned at the other focal point. Such systems are cumbersome, bulky and expensive.

Similar problems of light collection exist in reading a document with a flying spot scanner wherein fiber optics are often used to collect reflected light over a long thin slit near the scan line of the document. The fiber optic collector is large, bulky, and costly and frequently has a low signal to noise ratio.

Accordingly, it is an object of the present invention to provide a simple and compact reference system or simple and compact reading system that minimizes or avoids the above-mentioned problems.

SUMMARY OF THE INVENTION

In carrying out principles of the present invention in accordance with a preferred embodiment thereof, a scanning energy beam is modulated according to a pattern to be read, and the modulated beam is retroreflected for detection. The pattern can be either a transparent document to be read by the scanning beam or a reference code pattern scanned by a reference beam. For document reading the scanning beam is passed through the document to be read, retroreflected back through the document and then collected. For a reference beam that is scanned in synchronism with a reading or writing beam, the reference beam is modulated by being passed through a code mask to impinge upon a relatively larger area of a retroreflective material adjacent the mask. Unwanted reflections from the document or mask surface are separated to attenuate or eliminate response of the detector thereto.

BRIEF DESCRIPTION OF THE DRAWINGS

FIG. 4 is a fragmentary pictorial illustration, with parts broken away, showing structural details of code member and retroreflector;

FIG. 11 schematically illustrates some of the optical components for use with a retroreflective reading system; and FIG. 12 schematically illustrates certain of the optical components employed in a retroreflective system capable of reading or writing or modulating.

REFERENCE SYSTEM

The reference system is described herein as embodied in a laser writing system. Nevertheless, it will be readily understood that laser reading systems also use similar reference beams to provide a read beam position reference. Accordingly, the reference beam system described herein can readily be applied to such laser reading systems.

Figure 1:
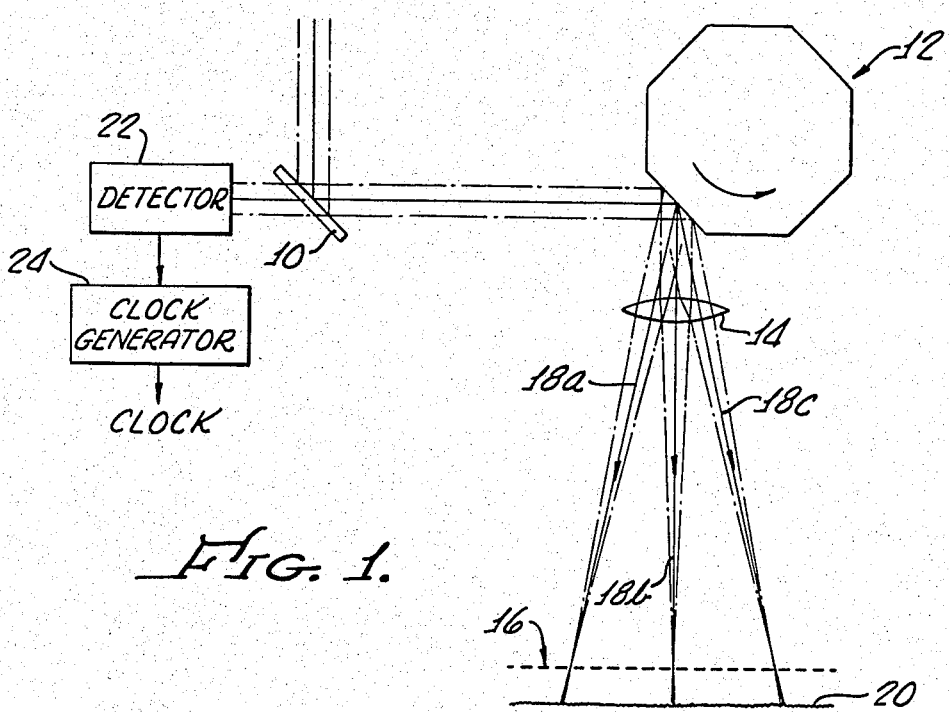
FIG. 1 schematically illustrates a scanning retroreflected reference beam.

Illustrated in FIG. 1 is a schematic representation of basic features of the reference system, omitting from this illustration elements of the read or write system that are not primarily involved in the reference generation. A suitable generated reference beam, such as the beam from a laser, is collimated and reflected from a beam splitter 10 to a scanning mirror 12, shown as an octagon having a reflective mirror on each of its eight surfaces and connected to be continuously rotated. The collimated reference beam is reflected from each surface of the polygonal scanning mirror in turn, being caused to make one complete linear scan by each scanning mirror surface, whereby the reference beam will linearly scan repetitively as mirror 12 rotates. The beam is directed from the scanning mirror through a focusing lens 14 to be focused upon the surface of a code member or apertured mask schematically indicated at 16. The mask comprises a series of alternating transparent and opaque areas so that as the beam is caused to scan (from left to right as seen in FIG. 1) it is chopped by the mask. Beam dimensions at its focal plane, the plane of the mask, in the direction of its scan are less than the width of any transparent area so that the beam may freely pass through a single mask aperture as it moves through positions indicated generally at 18a, 18b and 18c, in succession.

Fixedly positioned on the other side of mask 16, and spaced from the mask by a suitable distance, is a body of retroreflective material 20 that is coextensive with the mask. The material may be a commonly available strip having a reflective coating of the type that will reflect a major portion of incident energy back along the direction of incidence. Such material may be made by affixing spherical glass beads to a backing member in a suitable adhesive, leaving portions of the beads exposed. At each position of the beam wherein the projected or outgoing beam is not blocked by the mask but passes through a mask aperture, the beam is reflected back through the mask along the path of incident beam. The retroreflected beam passes back to the scanning mirror, thence from the scanning mirror to the beam splitter 10, having been collected and collimated by the lens 14. The retroreflected energy passes through the beam splitter to an energy detector 22. The output of the detector is fed to a clock generator 24 which generates the desired reference clock that in effect defines the location of the write beam (not shown in FIG. 1) that scans in synchronism with the reference beam.

Figure 2:
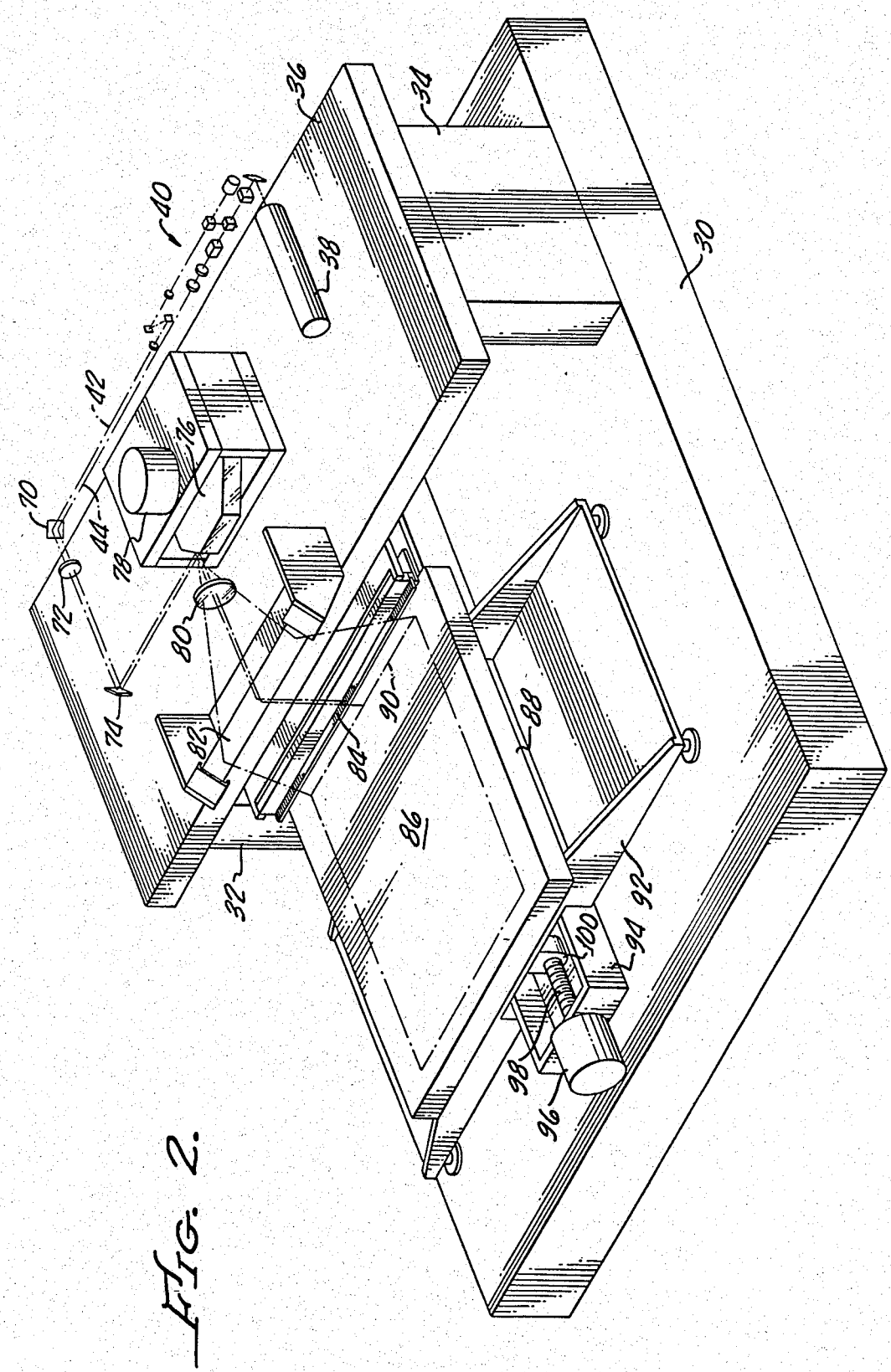
FIG. 2 is a simplified pictorial illustration of a laser flying spot scanner employing principles of the present invention.

Illustrated in FIG. 2 are fundamental features of a laser writing system embodying principles of the present invention.

A base 30 includes a pair of column structures 32, 34 carrying a scanner table 36 on which is mounted a laser 38 and an optical system 40 (shown inverted in FIG. 2) that generate a write beam 42 and a reference beam 44. The two beams may be mutually spaced in a vertical plane.

Figure 3:
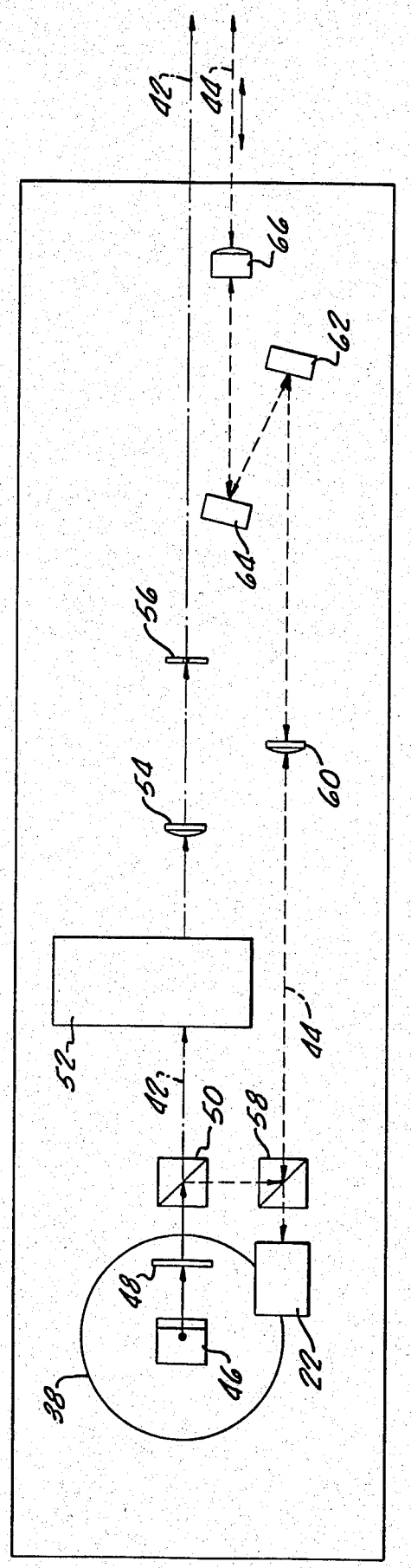
FIG. 3 schematically illustrates optical components for producing write and reference beams.

As shown in FIGS. 2 and 3, the beam from laser 38 is directed to a first turning mirror 46 and reflected therefrom through a half wave plate 48 and thence to a polarization sensitive beam splitter 50. From beam splitter 50 the write beam 42 passes through a conventional modulator 52 thence to a light beam spreading lens 54 that may, for example, increase beam diameter from 1 millimeter to 15 millimeters (at the polygonal scanning mirror to be described). The spread beam then, depending on the excitation of the modulator by a signal containing data to be written, is defracted and passes through the aperture of a modulator aperture plane 56, or, in the absence of a signal is completely blocked by the aperture plate.

The laser beam is reflected from beam splitter 50 to provide the reference beam which is directed to a second beam splitter 58 which turns the reference beam 44 to a direction substantially parallel with and spaced from the write beam. The reference beam passes through a reference beam spreading lens 60 and thence to a pair of beam path lengthening reflectors 62, 64 to a reference beam spreading and shaping cylindrical lens 66 that provides the reference beam with a chisel shape or elongated cross section.

The two beams are reflected from a turning mirror 70 through a collimating lens 72 to the second turning mirror 74 which directs the two to the reflective surfaces of a polygonal mirror 76 which is rotated at a constant speed by a motor 78. The write beam passes through the center of lens 72 without deflection but the lower reference beam is deflected upwardly as it passes through the lens below the lens center so that the two beams are substantially overlapped at the scanning mirror 76.

Both beams are reflected from each surface of the mirror 76 through a focusing objective lens 80 and complete their horizontal traverse at a horizontally elongated turning mirror 82. The structure described to this point is mounted upon the scanner support table 36.

In the illustrated exemplary embodiment the reference beam is inclined slightly upwardly to cross the write beam at the scan mirror surface whereby the reference beam will strike a higher portion of the turning mirror 82 and be reflected downwardly to a reference beam coding or modulating structure generally indicated at 84. The reference beam passes closer to the edge of the table 36. The write beam, on the other hand, strikes a lower portion of the turning mirror 82 and is reflected vertically downwardly along a path slightly further from the table 36 to impinge upon the write medium, which may be a suitable light sensitive emulsion 86 carried by a suitable substrate (not shown) upon a table 88. Rotation of the scanning mirror 76 causes the reference beam to scan substantially the full length of the reference coding assembly 84 and also causes the write beam to traverse its linear scan path 90 across the surface of the write medium 86.

The position of the scan line 90 and write medium 86 is moved for each successive scan by moving the write table 88 horizontally, in a direction perpendicular to the length of the scan line 90. To this end, table 88 is mounted upon a carriage 92 which is guided along a rail 94 mounted upon the system base 30. A motor 96 drives a lead screw 98 engaged with a nut 100 carried by the table 88 to move the table for successive scans.

It will be appreciated that specific details of the laser writing system are merely exemplary and many different systems may be employed having different write medium support and drive mechanisms, different optical systems, different types of scanning mirrors and different methods of reference beam generation. The write and reference beams may be parallel and displaced, or follow other separate paths to a common or synchronized scan mirror to insure synchronous scanning of the two beams. Alternatively, the write and reference beams may be of different colors, coincident, and separated by dichroic components.

The relative horizontal displacement of the final vertical legs of the reference and write beams in the described arrangements allows the coding assembly 84 to be horizontally displaced from the write beam scan line 90. To enable the write medium carrying table 88 to be driven longitudinally, perpendicular to the beam scans, the table is positioned slightly below the reference beam coding assembly 84 by a suitably small distance sufficient to provide clearance. The compact arrangement of the retroreflective coding assembly allows for a compact packaging of the system.

Figure 5:
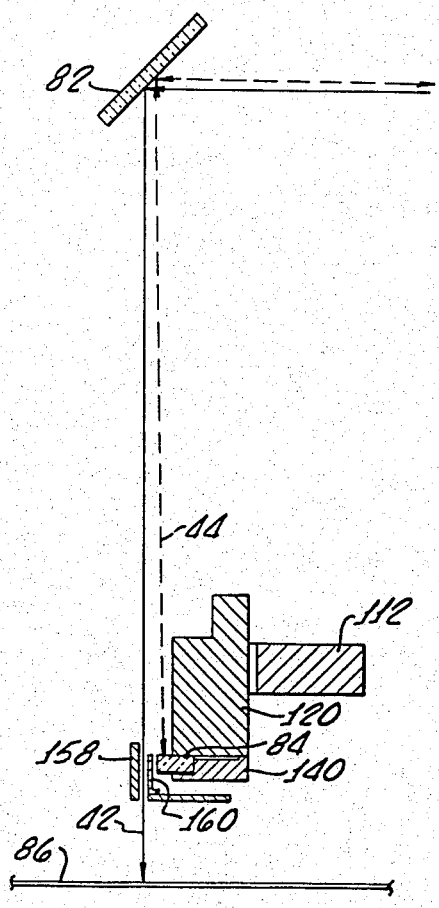
FIG. 5 is a fragmentary sectional view illustrating the relation between the write and reference beams at the code member and retroreflector.

FIGS. 4 and 5 show further details of the apparatus that mounts the reference beam coding assembly and passes the write beam past this assembly in isolation therefrom.

Mounted to a wall 110 of the system (not shown in FIG. 2) is a fixed structural support 112 extending completely across and above the writing medium table 88. Journals 114, 116 are fixedly suspended from support 112 and pivotally carry a transversely extending shaft 118 that is fixed in a transversely extending support block 120. The angular position of block 120 may be adjusted by a spring urged bolt 122 extending through block 120 into threaded engagement with a nut 124 carried on the support 112.

Figure 6:
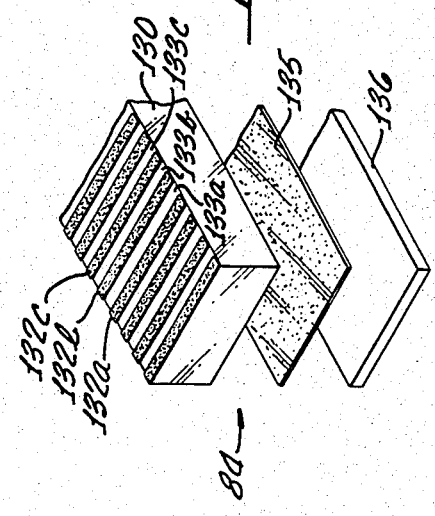
FIG. 6 is an exploded pictorial view of portions of the code member and retroreflector assembly.

The rigid elongated reference beam coding assembly 84 is fixedly mounted to the lower surface of support block 120. Coding assembly 84, as can be best seen in FIG. 6, is formed of a glass substrate 130, having a substantial thickness, and having one surface that carries a photographic emulsion in which the desired code pattern has been fixed. Although many different code patterns may be employed, it is presently preferred to form the code pattern of alternating opaque and transparent areas. Thus, the code pattern comprises a plurality of opaque transverse bars 132a, 132b, 132c, etc. separated by clear spaces 133a, 133b and 133c, etc. The bars and spaces of the code pattern extend completely across the entire width of the transparent substrate and cover its entire length, alternating between opaque and transparent areas of the length of the substrate. The width of each bar and of each space (as measured in the direction of scanning) in a preferred embodiment are the same, each having a width of 5 mils, for example. Accordingly, a reference beam having a transversely elongated shape and being focused to a width or smallest dimension at the surface of the mask of about 1 to 2 mils can readily pass through any single mask space but will be chopped, being turned completely on or off, as the beam scans the length of the code member.

A strip of retroreflective material 135 is mounted to the lower surface of the transparent substrate 130, the surface opposite that which carries the mask. The retroreflective material 135 is a commonly available retroreflective strip such as projection screen material 7610 manufactured by Minnesota Mining and Manufacturing Co. It is held in place against the lower surface of the glass substrate by a relatively rigid plate 136.

A coding assembly clamping bar 140 (FIG. 4) is fixed to the lower edge of support block 120 and is longitudinally rabbeted or relieved to provide a forwardly projecting tongue or flange 142 that extends the full length of the clamp and is spaced from the lower surface of the support block. The coding assembly, including the glass substrate with its mask, the retroreflective strip 135 and holding plate 136 are all sandwiched together between flange 142 of clamp 140 and the lower edge of support block 120. A part of the coding assembly protrudes forwardly of block 120 for its full length. Thus, the coding assembly is rigidly positioned and yet projects for its full length forwardly of the front surface of support block 120 to receive the scanning reference beam.

In the use of a coding mask in this retroreflective system the opaque areas are preferably not only opaque but also absorptive so as to provide a minimum of reflection. Nevertheless, it is often desirable, in the manufacture of such a mask, to use processes and materials in which an opaque material having light reflective characteristics is etched or otherwise manipulated to provide alternating opaque and transparent areas. In such a mask the opaque areas themselves will be highly reflective at certain aspects. In addition, in certain aspects, the upwardly facing surface of the glass substrate (between adjacent opaque mask bars) may be highly reflective. Reflection from either the opaque areas or the glass substrate surface on which the mask is carried should not be transmitted to the reflector. The reference signal must be derived from the reference beam that has been modulated by the mask and reflected back through the system optics to the detector. Other reflections of the reference beam are not to be received by the detector. The detector desirably has no response to energy reflected from the mask surface.

If the coding assembly and, more particularly, the surface of the coding mask, were to be precisely perpendicular to the reference beam axis, the detector would receive an excessively and unacceptably large amount of reflected energy when the beam, during the intermediate portion of its scan along the mask, is substantially vertical (precisely or nearly precisely perpendicular to the surface of the mask). At such a position, and because reflection from the opaque mask areas and from the exposed glass surface is specular, these areas may act as a highly polished mirror and reflect a large quantity of light back along the optical path. When the beam is at or near outer ends of its scan these unwanted reflections from the opaque areas of the mask and from the glass substrate surface are directed away from the optical path and will not fall within the field of the detector.

Most conveniently the unwanted unmodulated reflection that could otherwise occur when the reference beam is perpendicular to the mask surface is separated from the modulated signal received by the reflector by simply pivotally shifting the entire coding assembly about the axis of shaft 18 (by operating adjustment bolt 122). The coding assembly is pivotally adjustable about the axis of the shaft 18, an axis that is parallel to the reference beam scan path. The angular shifting may be just a few degrees and need be only sufficient to insure that light reflected from the surface of the coding assembly when the reference beam is at the center of its scan is displaced by a distance great enough to cause the reflected (unmodulated) light to pass above or below the upper or lower surface of the polygonal mirror. In other words, the coding assembly is simply tilted about an axis parallel to its length so that light reflected from its upper surface will not impinge upon the polygonal mirror. This tilting, of course, does not cause light from the retroreflected material to miss the mirror because the retroreflected light is always reflected back along the reference beam axis.

Write beam 42 (FIG. 5) passes closely adjacent the coding assembly (approximately one-quarter inch from the edge of the coding assembly in an exemplary embodiment). It is desirable that any stray light from the reference beam or other parts of the optical system be blocking from following the path of the write beam to the writing medium. For this purpose there is provided a write beam isolating slit 150 formed in the bottom of a horizontally extending plate 152 having its ends projecting outwardly for adjustable mounting in horizontally extending slots 154 of a pair of mounting blocks 156. Plate 152 carries an integral upstanding front wall 158 that extends vertically upwardly at the front side of slit 150. A rear wall 160 extends the length of the slit and projects upwardly at the rear edge of the slit to provide a narrow relatively deep passage for the scanning write beam so as to isolate the latter from stray light.

Figure 7:
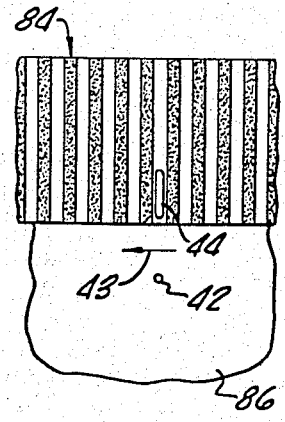
FIG. 7 is a plan view of a fragment of the code member.

As illustrated in FIG. 7, the write beam, indicated at 42, impinges upon the writing medium 86 slightly in front of the transversely elongated reference beam 44 and the two traverse their respective targets, the writing medium and the code member, (in the direction indicated by arrow 43) in precise synchronism with one another.

Figure 8:
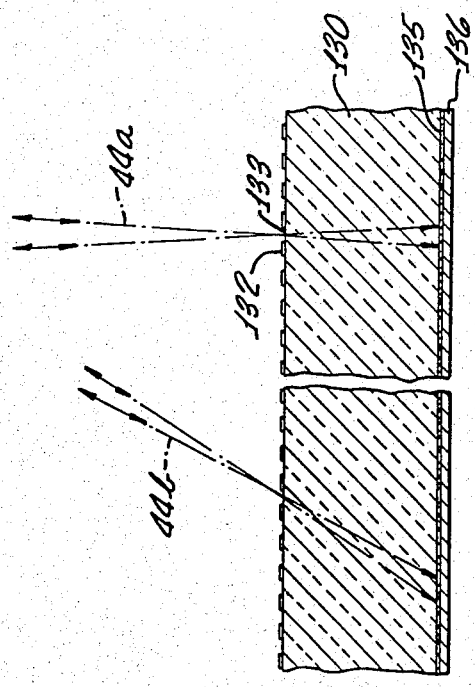
FIG. 8 is an enlarged sectional view of the code member and retroreflector assembly.

FIG. 8 illustrates the retroreflective action of the retroreflector strip 135, showing the reference beam at a position 44a adjacent a midpoint of its scan path and at a position 44b near an edge of the scan path. This figure illustrates that regardless of the angle of incidence of the reference beam, a majority of the energy of the beam is reflected back along the path of incidence, and, further that the beam impinges upon an area of the retroreflective material that is greater than the area of the beam at the mask.

It is important, as previously mentioned, that the reference beam have a narrow dimension at the mask member as it impinges on the mask and have a larger dimension on the retroreflective strip. The beam has a narrow dimension to enable it to completely pass through a single mask aperture. It has a greater dimension at the retroreflective strip to insure illumination of an adequately sized area (a sufficient number of reflective beads) of the retroreflective material.

The thickness of the glass substrate spaces the retroreflective material from the mask and also helps to increase the beam dimension at the point of its impingement on the retroreflector. The narrow beam, focused to a dimension sufficient to enable it to readily pass through a single aperture of the mask upon incidence, is diverging as it leaves the mask to pass through the glass substrate. The glass thickness is sufficient to cause the reference beam to impinge upon the retroreflective strip over a greater area. Thus, the desired increased area of illumination of the retroreflective material is achieved by either or both of (a) using long narrow mask apertures and a correspondingly shaped reference beam and (b) displacing the retroreflective material from the mask to allow it to diverge and enlarge before it impinges on the mask.

Part of the optics employed for the outgoing reference and write beams are also employed to control the path of the modulated reference beam which is fed back to the turning mirror 82, thence to the objective lens 80 for reflection from the scanning mirror 76 and through the other optical elements of the reference beam path to beam splitter 58 (FIG. 3) which passes the reflected beam to detector 22. In effect, scanning mirror 76 causes the field of view of the fixed detector to scan in synchronism with the scan of the write beam. The scanning detector field is always aimed at the same point in space (displaced by a small fixed distance) as the write beam. With a code member mask having opaque and transparent areas of 5 mils an exemplary system will generate one reference pulse for each 10 mils of scan travel. The clock generator 24 includes suitable electrical frequency multiplying circuitry to provide one pulse for each one mil of travel of the beams in their scan path, thus precisely locating the write beam for each 1 mil of its scan travel.

The described reference system provides significantly increased accuracy in location of the writing or reading beam and thus provides compensation for a number of errors of the reading or writing system, such as, differences between the several facets of the polygonal scanning mirror, the "wow" or variation in rotational speed of the scanning mirror and hunting, in addition to avoiding the expense complexity and bulk of fiber optic collectors and similr devices.

READING SYSTEM

Figure 9:
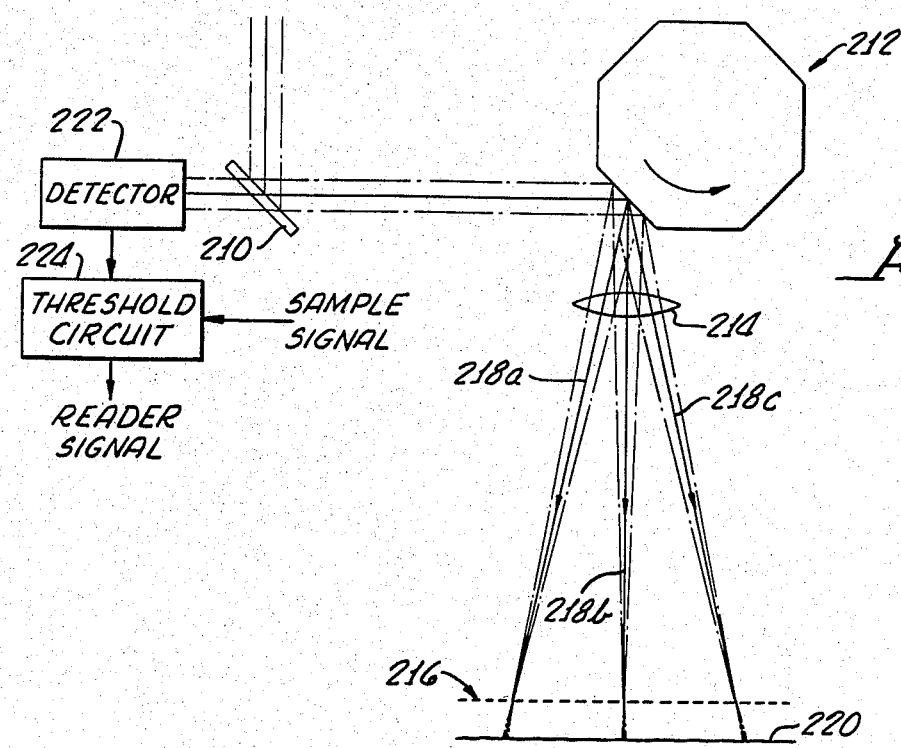
FIG. 9 schematically illustrates a scanning retroreflective reader.

From one point of view, the above described reference system is a reader that reads a one dimensional pattern of the code mask, providing information that defines the pattern itself, namely, the width of opaque lines and of the spaces between the opaque lines. It will be readily appreciated that the principles employed in the above-described reference system may be used for reading any two dimensional pattern, actually a document, wherein the pattern is formed of opaque and transparent areas such as, for example, a negative or positive photographic film of a sheet of text, drawing, or the like. Accordingly, for use in an optical reader where an optical beam is scanned across a document to be read and reflected light is collected to indicate a pattern on the document, a body of reflective material is positioned at one side of the document and the optical beam is transmitted through and modulated by the document to illuminate the retroeflective material. Light received by the retroreflective material is retroeflected back through the document. The retroreflected light is collected to provide an indication of a pattern of transparent and opaque areas on the document. FIG. 9 schematically illustrates an arrangement similar to that of FIG. 1 wherein the described principles are used for reading. The system illustrated in FIG. 9 is similar in many respects to the previously described reference generating system and, in fact, may use many of the same components. A suitably generated read beam such as a beam from a laser is collimated and reflected from a beam splitter 210 to a scanning mirror 212 that is continuously rotated as previously described. The collimated beam is reflected from each surface of the polygonal scanning mirror and directed to focusing lens 214 to be focused upon the surface of a document such as a film or transparency 216. Document 216 is a transparency having a positive or negative image of a document such as a drawing, text or other pattern formed in the document body or upon its surface by alternately opaque and transparent areas. Accordingly, as the beam is caused to scan through positions indicated at 218a, 218b and 218c successively, light will pass through the transparent areas of the document but not through the opaque areas. The beam has an area of approximately 1 mil at its focal plane, the plane of the document, and as the beam scans in one direction, the document and its support (not shown in FIG. 9) are carried in a direction perpendicular to the scan line by a mechanism which may be identical to the shifting mechanism illustrated in FIG. 2, whereby the document will be scanned in a plurality of closely adjacent mutually parallel lines that cover the entire two dimensional area of the document.

Fixedly positioned on the other side of document 216 and spaced from the document by a suitable distance is a sheet of retroreflective material 220 that is slightly larger than the document. The retroreflected material may be of the type described above in connection with FIGS. 1 through 8. Light passing through the transparent areas of the document impinges upon the retroreflective material and is directed back through the transparent document areas along the path of the incident beam. The retroreflected beam passes back to the scanning mirror and thence from the scanning mirror to and through the beam splitter 210, having been collected and collimated by the lens 214. The retroreflected energy passes through the beam splitter to an energy detector 222, the output of which feeds a threshold circuit 224 which provides an output signal indicating whether the detector output is above or below a preselected threshold level. The threshold circuit is periodically enabled by a sampling or gating signal that is provided from the output of the previously described reference beam clock generator 24 (FIG. 1) or which may be provided from some other known reference generating system commonly employed in optical readers. Such reference systems include time-based clock generators and encoders coupled with the scanning mirror shaft. Accordingly, the output of the threshold circuit will provide a reader signal for every one mil of the scanned document (where a reference sampling signal is generated at 1 mil intervals) thereby digitizing the document by denoting whether the particular point of the document at such scan position is opaque or transparent.

Figure 10:
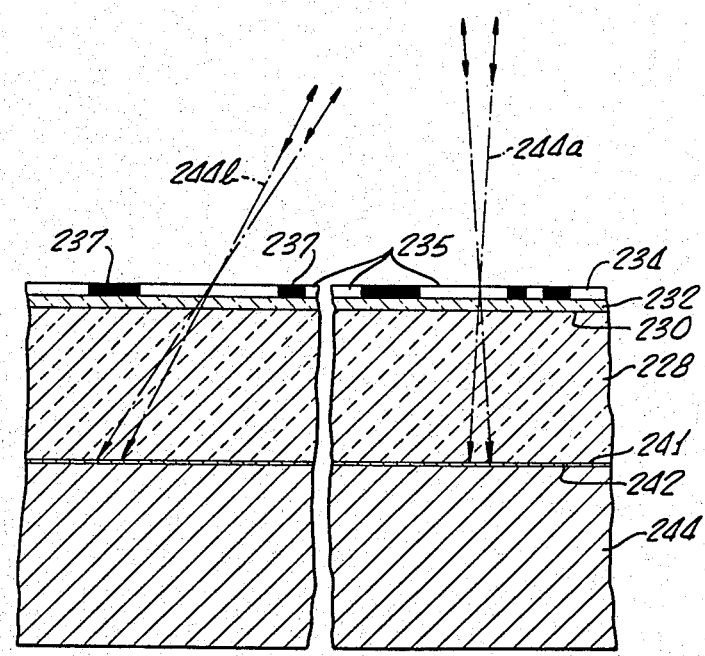
FIG. 10 is an enlarged fragmentary sectional view of a transparent document and retroreflector assembled for reading.

As illustrated in the enlarged fragementary view of FIG. 10, a document to be read is mounted upon a relatively thick, rigid and transparent spacer platen 228 having a first surface 230. The document may comprise, for example, a conventional film positive or negative having a transparent film substrate 232. One surface of the film is coated with a conventional emulsion 234 which, after exposure and development, has a pattern of transparent areas 235 and opaque areas 237. Preferably, the document is a positive having opaque or dense areas forming lines on a clear or transparent background. Obviously, many other types of transparencies may be employed limited only by the requirement that a pattern on the document be defined by clear or transparent areas and less clear or opaque areas. Secured to the opposite surface 241 of transparent spacer platen 228 in close and intimate contact therewith throughout its area is a sheet of retroreflective material 242 that is coextensive with the transparent spacer 228, which in turn is slightly larger than the document to be read, so that an energy beam passing through the document at an angle will still illuminate a portion of the retroreflective material. The spacer and its retroreflective material 242 are mounted on a thicker rigid metallic base or support platen 244 which provides a precision planar surface for the retroreflective material. The film is held in close contact with the upper surface 230 of the spacer 228 throughout the entire area of the film by means of a vacuum or other suitable means that will be readily apparent to those skilled in the art. When the transparency is sufficiently rigid or small enough to be supported solely at its periphery, the transparent spacer may take the form of a skeletal frame.

A reading beam directed along a line normal to the surface of the film, spacer and retroreflective material, as indicated at 244a, will pass through a transparent area of the film and through the transparent spacer to the retroreflective material which reflects the energy beam back along its incident path. The beam is focused at the plane of the document and accordingly as it propagates through the transparent spacer 228 from upper surface 230 to lower surface 241 it diverges and expands, thus illuminating a relatively large area of the retroreflective material even though the beam is of a very small size (1 mil, for example) at the transparent document. The thickness of spacer 228 is approximately one-half inch and provides adequate expansion of the reading beam. The reading beam at the transparent document has an area that is small as compared with the area of the elongated reference beam previously described at the code mask surface and, therefore, a greater expansion of the beam is needed in the reading arrangement of FIG. 10. The transparent spacer thickness is sufficient to enlarge the beam at the retroreflective material so it will cover as much of the retroreflective material as necessary to minimize signal variation as the spot moves across the document.

The described arrangement is operable with either a positive or negative document. Nevertheless, if the document includes relatively narrow lines, operation is improved by reading a positive wherein the narrow lines are formed by opaque areas and relatively larger areas of transparent material space the narrow lines from one another. In a negative, on the other hand, where the transparent areas are narrow, light from the retroreflective material, which also scatters light to some extent, may be blocked from retroreflection back through the transparent material and thus the retroreflected signal fed to the detector 220 may be of decreased magnitude. In other words, it is preferred to employ the described arrangement with a document in which transparent areas are relatively larger, in general, than opaque areas. Employing the described reader with a positive rather than a negative simplifies the required sensitivity of the threshold circuit and further causes the return signal to be less image dependent, that is, the return signal varies less with variation of line widths where the lines are opaque rather than transparent.

Just as described in connection with the reference beam generator, undesired reflections from the surface of the document being read are desirably separated or attenuated so as to eliminate response of the detector to such reflections. To this end the beam is caused to scan along a plane angularly displaced with respect to a normal to the pattern being scanned. The separation or attenuation is achieved in the manner described above with respect to the reference generator merely by tilting the surface of the document to be read about an axis that runs in the direction of the length of a scan line so that the read beam will not be directed along a normal to the document surface. As previously described, this inclination for eliminating unwanted reflection need be but a few degrees.

In the reader of FIGS. 9 and 10, as in the previously described reference system, retroreflection of the reading beam or the reference beam respectively may be provided by use of a telecentric lens system wherein all rays of the light output of the lens system are parallel to the lens axis. With such a lens system the document will be scanned by a beam that is at all times precisely normal to the document being scanned. In such an arrangement, the retroreflective material may be replaced by a highly reflective surface such as a mirror positioned directly at the lower surface of the film substrate 232. The mirror is retroreflective for all light thereon in a direction perpendicular to the mirror surface. A telecentric lens system of this type would provide an exceedingly high contrast between opaque and transparent areas of the document. However, such a system is inherently capable of reading only a relatively small two dimensional area of a document if costs are to be kept within feasible limits. It is not economically feasible to provide such a telecentric lens system with a diameter of more than about 4 inches and such a lens system must be coextensive with the document being read. Accordingly, a scan line for such a system would have a maximum length of approximately 4 inches and the system would read only 4 inch wide columns so that to read a document of greater width a number of adjacent 4 inch wide columns would have to be read. Because it is difficult to precisely align scan lines in successive scanning columns in such a system, the telecentric lens arrangement is of much greater utility in reading a document than in writing.

The document reader illustrated in FIGS. 9 and 10 may employ an optical arrangement of the type shown in FIG. 11 including a read beam and a reference beam, the reference beam being identical to the reference beam described above and illustrated in FIGS. 2, 3, and 4. As shown in FIG. 11, the beam from a laser 238 is directed to a first turning mirror 246 and reflected therefrom through a half-wave plate 248 and thence to a polarization sensitive beam splitter 250. From beam splitter 250, the read beam 242 passes through a second beam splitter 243 and thence to a light beam spreading lens 254 and through an aperture plate 255 to the polygonal scanning mirror via the turning mirrors positioned, as illustrated in FIG. 2. The light beam is then directed to the document to be scanned which is carried for motion transverse to the scan line by the same structure illustrated for use in the system of FIG. 2.

The outgoing beam is also reflected from beam splitter 250 to provide the reference beam 244, which is directed to a second beam splitter 258, which turns the reference beam 244 to a direction substantially parallel with and spaced from the read beam. The reference beam then passes through a spreading lens 260, a pair of beam path lengthening reflectors 262, 264 and thence to a reference beam spreading and shaping cylindrical lens 266 to follow the path previously described in connection with the reference beam system.

The read beam energy retroreflected back through the transparent spacer 228 and through transparent areas 235 of the document is directed along the optical path by the system optics including the scanning mirror, through the aperture plate 255 and lens 254 to be reflected by beam splitter 243 to the read detector 220. The reference beam is retroreflected as previously described to the reference beam detector 22.

Because the system employs two retroreflected beams being propagated along closely adjacent optical paths, it may be desirable to minimize the possibility of cross talk between the two paths. For this reason, the blocking masks 255 and 261 are provided in the read and reference beam paths, respectively. The masks are made of an opaque material having an aperture or clear opening of the proper size and shape to allow the desired image of the retroreflected beam to pass. For the read beam, the clear mask aperture is a small circular hole, whereas for the reference beam the aperture of the blocking plate 261 is a small vertical slit to pass the image of the chisel-shaped reference spot.

It will be seen that the read system of FIGS. 9, 10 and 11 is substantially identical to the write system illustrated in FIGS. 1 through 8, primarily differing in the substitution of the read detector 220 and beam splitter 243 for the modulator employed in the writing system. In the read system of FIG. 9, aperture plate 56 of FIG. 3, employed as part of the modulator, is also omitted. The remainder of the optics and all the mechanical structure described above in connection with the reference system and laser write system remain the same for the reading system of FIG. 11 except for the addition of the blocking aperture plates 255, 261.

Because so much of the read system is identical to the write system, it is feasible to provide a system as illustrated in FIG. 12 which can be employed alternatively for reading or writing. Thus, the system of FIG. 12 includes all of the elements described above and illustrated in FIG. 3 including the modulator 52, lens 54 and pin hole plate 56. However, to allow the writing system of FIG. 3 to alternatively be employed as a reading system, a second beam splitter 354 is employed, interposed between the pin hole aperture plate 56 of the modulator and the turning mirror 70 (FIG. 2). The beam splitter 354 will pass the write beam when the system is employed for writing, as previously described, and the modulator 52 is caused to turn the writing beam 42 on and off as required for writing. A read detector 320 is employed to receive retroreflected light passing back to the beam splitter 354 and reflected at right angles by the latter when the system is used for reading. When the system is used for reading, the modulator 52 will be turned on so that the beam passing through the modulator will be deflected at all times so that it passes through the pin hole aperture of plate 56. Of course, for reading, the material placed upon the moving table 88 will be changed to the above-described transparent document. Further, aperture plate 355, having a circular aperture for the retroreflected read beam, and aperture plate 361 having an elongated aperture for the chisel-shaped reference beam are positioned as illustrated in FIG. 12. The read/write or dual system illustrated in FIG. 12 may be used to read a document, store the data, and process or otherwise edit the data. Then, simply by inserting a writing medium and operating the modulator 52 from the stored, edited or processed data, the latter may be used for writing the desired pattern, employing the very same equipment.

The described dual read/write machine of FIG. 12 may be employed in a facsimile system wherein the apparatus may be used in a first or read mode to read a document and transmit it to a remote station and where a second identical read/write apparatus in write mode writes the information. To transmit information in the other direction, the second apparatus is employed in a read mode and the first apparatus in a write mode.

In either write mode or read mode, the dual apparatus of FIG. 12 may also be employed to correct for variation of the polygonal scanning mirror facets. It is not economically feasible to build a polygonal scanning mirror in which all of the mirror facets lie in planes precisely parallel to the rotational axis. Accordingly, angular errors of the mirror facets can be measured and corrections made to the beam position according to the individual error of the respective facets. For example, for an eight-sided scanning mirror, the angular error of each of the eight facets is measured and stored in a memory for use in providing a correcting deflection of the scanning beam during the time that the beam is being reflected from each of the respective mirror facets. The correcting deflection is employed to vary the frequency of a correcting signal fed to the modulator 52 (FIG. 12). Thus, in addition to the on/off control signal to the modulator which causes it to deflect the beam between positions of maximum and minimum deflection, a correction signal is also fed to the modulator to superpose a relatively small correcting deflection on the beam to compensate for measured error of mirror facet inclination. The read/write system of FIG. 12 readily adapts itself to providing such mirror facet angle correction in a reading system, in addition to providing such correction in a writing system.

The system is aligned such that with no control signal, the laser beam 42 passes straight through the modulator 52, is focused by lens 54, and is blocked by the aperture 56. The modulator deflects the beam by an amount related to the frequency of the control signal. When a control signal of a nominal frequency is applied to the modulator, either intermittently to write data or continuously for reader use, the beam is deflected so it passes through the center of the aperture 56. For facet correction use, the frequency of the control signal applied to the modulator is varied slightly, causing the beam deflection to vary so that the beam will pass through the aperture slightly higher or lower than center, resulting in the proper correcting deflection for each facet.

The foregoing detailed description is to be clearly understood as given by way of illustration and example only, the spirit and scope of this invention being limited solely by the appended claims.

What is claimed is:

1. The method of reading and digitizing a transparent document, such as a sheet of text or drawing, having a pattern of transparent and opaque areas, said method comprising focusing an energy beam on a pattern of the transparent document, scanning said beam across the pattern to cause the beam to be transmitted through transparent areas, retroreflecting back through transparent areas energy of the beam that has been transmitted through the pattern, receiving beam energy that has been retroreflected, and periodically sampling received beam energy to provide digital signals representing said document, whereby signals representing the document may be stored or processed.

2. The method of claim 1 including the step of causing said beam to scan along a plane that is angularly displaced with respect to a normal to the pattern being scanned.

3. The method of claim 1 wherein said beam has a first area at said pattern, and including the steps of expanding said beam to an area larger than said first area after the beam has passed through said document but before it is retroreflected.

4. The method of claim 1 including the steps of removably mounting a document upon a body of retroreflective material, and spacing said document from said body by a predetermined distance.

5. In an optical reader for reading a transparent document, such as a sheet of text or drawing having a pattern of transparent and opaque areas, and wherein an optical beam is scanned across the document to be read and reflected light is collected to provide a representation of the pattern of transparent and opaque areas on the document to be read, an improved method of collecting light comprising the steps of detachably positioning a body of retroreflective material at one side of the document to be read, transmitting said optical beam through the document to the retroreflective material so that light received by the retroreflective material is retroreflected back through the document, precisely locating said optical beam in its scan, and collecting light retroreflected from said material back through the document to provide reader signals at points on the document along the optical beam scan denoting whether the document is transparent or opaque at such points, said reader signals collectively indicating the pattern of transparent and opaque areas on the document.

6. The method of claim 5 wherein said optical beam is focused on the document to be read, and including the step of expanding said optical beam between the document and retroreflective material to cause the beam to illuminate a relatively larger area of said material.

7. The method of claim 6 wherein said step of expanding comprises positioning said retroreflective material at a distance from said document that is larger than the dimension of said focused beam, and transmitting said beam from said document to said retroreflective material.

8. The method of claim 5 including the step of decreasing collection of light of said beam reflected from the surface of said document.

9. The method of claim 8 wherein said step of decreasing comprises effecting relative inclination of the plane of said document and the axis of said optical beam.

10. The method of claim 5 wherein said beam is scanned by reflection from a moving reflector, and wherein said step of collection of retroreflected light comprises transmitting said retroreflected light to said moving reflector, and collecting retroreflected light that is reflected from said reflector.

11. The method of claim 5 wherein said step of collecting comprises repetitively sampling said retroreflected light to provide said reader signals.

12. An optical transparency reader for reading a transparent document, such as a sheet of text or drawing, said reader comprising a transparent support having one side adapted to detachably receive a transparency to be read, a body of reflective material carried at the other side of said support and spaced from said one side of said support for reflecting a scanning beam passing through the support from said transparency, means for generating an optical energy beam, an optical scanning system for directing said energy beam at and focusing it upon said transparency in a scanning path to be transmitted through the transparency, through the support and to be reflected from said reflective material back through the support, through the transparency and through said optical system, means for locating the optical energy beam in its scan path, and detector means for receiving reflected energy in said optical system and for providing reader signals at closely spaced points along the scanning path denoting whether the document is opaque or transparent at such points.

13. The apparatus of claim 12 including means for deflecting said energy beam.

14. The reader of claim 12 including means for causing said scanning beam to be perpendicular to said transparency for at least a major portion of its scan.

15. The reader of claim 12 wherein said reflective material is retroreflective.

16. The reader of claim 12 wherein said body of reflective material is spaced from said one side by a distance greater than the thickness of said transparency, and is independent of and separable from said transparency.

17. The reader of claim 12 wherein said optical scanning system comprises means for projecting said energy beam at and through said transparency in a fan type sweep that impinges on said transparency at different angles of incidence in the course of its sweep.

18. The method of reading a transparent document, such as a sheet of text or drawing, comprising the steps of forming a transparent support for a document to be read, securing at one side of said support a retroreflective body, detachably securing to the other side of said support a document to be read, focusing an energy beam on the document secured to said support, scanning the beam across the document to cause the beam to be transmitted through the document to the retroreflective body, receiving energy of said beam that is reflected from the retroreflective body and passed back through the transparent document precisely locating the energy beam at each of a number of points of its scan travel, and providing a reader signal for each of a number of points on the document to denote whether such points on the document are opaque or transparent.

19. The method of claim 18 wherein said step of securing a retroreflective body comprises positioning the retroreflective body at a distance from said other side of said support sufficiently large to allow the beam area to increase as the beam travels from the document to the retroreflective body.

20. The method of reading a transparent document, such as a sheet of text or drawing, having a pattern of transparent and opaque areas, said method comprising focusing an energy beam on a pattern of the transparent document, scanning said beam across the pattern to cause the beam to be transmitted through transparent areas, retroreflecting back through transparent areas energy of the beam that has been transmitted through the pattern, receiving beam energy that has been retroreflected, precisely locating said energy beam in its scan travel, and periodically sampling received beam energy to provide a reader signal for each of a number of points of the scanned document to denote whether such points are opaque or transparent, said reader signals indicating the pattern of transparent and opaque areas on said document.

* * * * *